United States Patent
Takada et al.

(10) Patent No.: US 6,891,948 B2
(45) Date of Patent: May 10, 2005

(54) ECHO CANCELLER

(75) Inventors: Masashi Takada, Tokyo (JP); Atsushi Shimbo, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 436 days.

(21) Appl. No.: 09/968,527

(22) Filed: Oct. 2, 2001

(65) Prior Publication Data
US 2002/0064286 A1 May 30, 2002

(30) Foreign Application Priority Data

Nov. 27, 2000 (JP) ........................................ 2000-359076

(51) Int. Cl.[7] .......................... H04M 9/08; G10L 19/14; H04B 3/20
(52) U.S. Cl. ............................ 379/406.01; 379/406.08; 704/224; 381/66
(58) Field of Search ............................ 381/66; 379/406, 379/406.08; 704/224

(56) References Cited

FOREIGN PATENT DOCUMENTS

EP 880260 A2 * 11/1998 ............ H04M/9/08
EP 884886 A2 * 12/1998 ............ H04M/9/08

OTHER PUBLICATIONS

"Introduction to Adaptive Filters", S. Haykia, Macmillan Publishing Co., New York.

* cited by examiner

*Primary Examiner*—Forester W. Isen
*Assistant Examiner*—Devona Faulk
(74) *Attorney, Agent, or Firm*—Venable LLP; James R. Burdett

(57) ABSTRACT

The present invention provides an echo canceller having a holding portion which holds at least a communication frame length's worth of reception signals; a power calculation portion which calculates power for each communication frame based on the reception signals held in this holding portion; a divider which divides, by the power calculated for each communication frame, the echo elimination residue signal for each sample of the communication frame output from a subtractor; and an update portion which updates the tap coefficients of an adaptive filter according to the output signals from the divider.

3 Claims, 17 Drawing Sheets

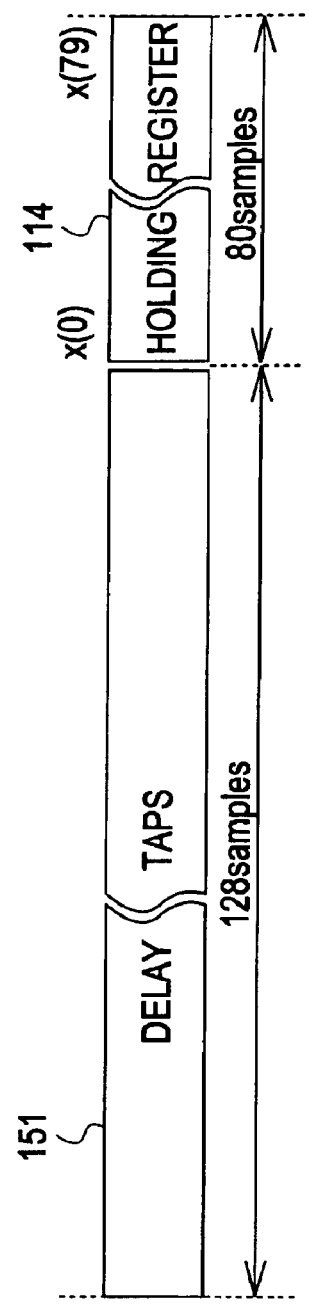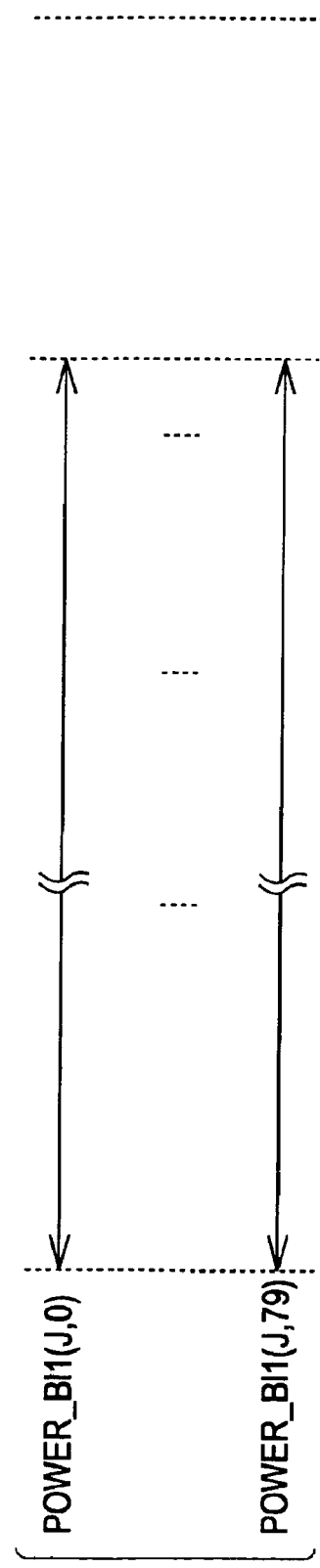
FIG.6A
FIG.6B

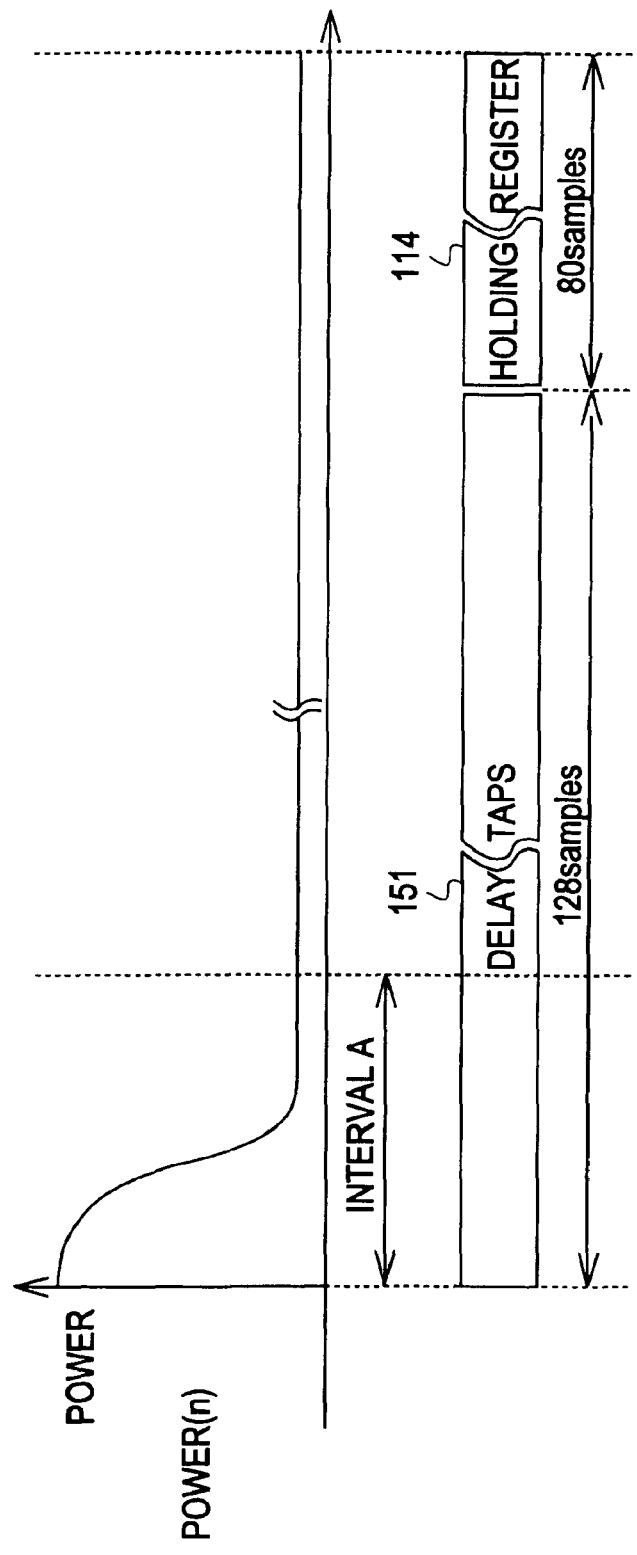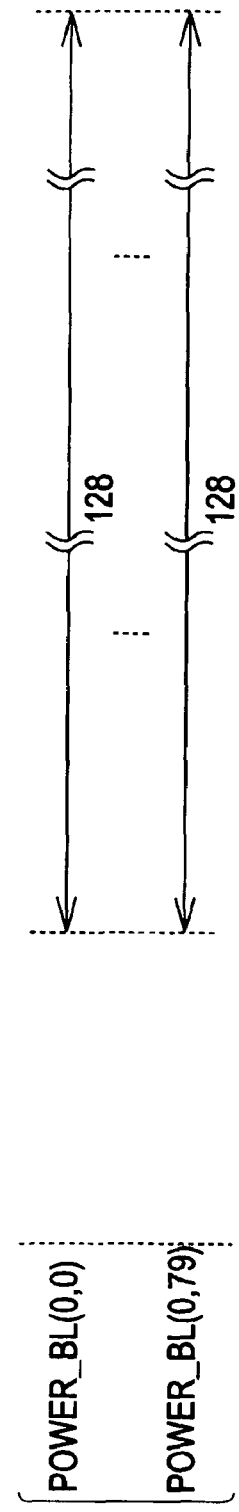

ECHO CANCELLER

BACKGROUND OF THE INVENTION

1. Field of the Invention

This invention relates to an echo canceller based on a prescribed echo model.

2. Description of Related Art

In general receiver terminal devices, an audio signal from an exchange network is introduced via a four-line circuit, and this is supplied to many types of service by a two-line circuit. At the termination of such a communication circuit, various echo cancelling techniques are used in order to deal with impedance mismatching. These techniques are disclosed in the reference "Introduction to Adaptive Filters", S. Haykin, Macmillan Publishing Co., New York, and elsewhere.

For example, there is a technique which uses an echo canceller with the configuration shown in the block diagram of FIG. 2. In FIG. 2, this echo canceller 10 which is an example of the conventional art has a receiving signal route comprising a reception input terminal Rin 11 for reception from the exchange network, an analog/digital converter 12, an input reference point 13 for an adaptive filter 40, described below, a digital/analog converter 14, and a reception output terminal Rout 19.

Signal exchange from a four-line circuit network to a two-line circuit via a hybrid transformer 20 is performed, and a transmission signal route comprises a transmission input terminal Sin 31, another analog/digital converter 32, a pseudo-code signal Y(n) adder 33, a residual echo difference (residue) signal e(n) output detection point 34, another digital/analog converter 35, a transmission output terminal Sout 39, and an adaptive filter 40 having a prescribed adaptive algorithm.

In this echo canceller 10, an audio signal X from a remote location is input to the reception input terminal Rin 11 via an exchange network, not shown, and is converted into a digital reception signal X(n) by an analog/digital converter 12. When this reception signal X(n) passes through the input reference point 13, it is again converted into an analog signal by the digital/analog converter 14, and is input to the hybrid transformer 20. The analog signal is led to a receiving terminal device via a two-line circuit, not shown. Here the lowercase letter "n" signifies that the audio signal X is sampled at time n to result in the nth signal.

At this time, at the hybrid transformer 20, part of the analog symbol becomes an echo signal y due to inevitable impedance mismatching, and is reflected to the transmission input terminal Sin 31. When this echo signal y is converted into a digital signal y(n) by the analog/digital converter 32, the digital signal is canceled by the pseudo-echo signal Y(n) of the adaptive filter 40 through the adder 8. However, the when residue signal e(n) is input to the digital/analog converter 35 via the output detection point 34, it is again converted into an analog signal and transmitted from the transmission output terminal Sout 39 to the remote transmission terminal device.

Hence at the adaptive filter 40, the pseudo-echo signal Y(n) is controlled such that this residue signal e(n) is minimized. That is, digital signal processing is performed while monitoring the reception signal X(n) at the input reference point 13, and in addition the pseudo-echo signal Y(n) is formed based on the residue signal e(n) from the output detection point 34. By means of such an echo canceller 10, the echo signal y returned to the remote transmission terminal device can be eliminated to the maximum extent, and the voice communication quality of the exchange network can be improved, so that such echo cancellers are widely used. From the reception terminal device, the transmission signal is sent to the exchange network independently of the echo signal y, via the hybrid transformer 20, this echo canceller 10, and the transmission output terminal Sout 39.

Next, an example of the functions of the adaptive filter 40 is shown in the block diagram of FIG. 3, and an example of the technique for generating a specific pseudo-echo signal Y(n) is explained. This adaptive filter 40 comprises a cyclic FIR filter portion 41, which is a well-known FIR (finite impulse response) filter, and a coefficient update portion 50 to update the filter coefficient (tap coefficient).

The FIR filter portion 41 comprises a variable register 42 for the reception signal X(n) train, a multiplier-accumulator 43 to perform multiplication and accumulation according to the respective delays, and a coefficient register 44 for the tap coefficient. The coefficient update portion 50 has delay taps 51 for the reception signal X(n) train, a power calculation portion 52 for each reception signal X(n), a divider 53 using the power signal, and an update amount calculation portion 54 for each tap coefficient based on the residue signal e(n) for each reception signal X(n).

By this means, the tap coefficient is updated according to the power of the reception signal X(n) train by the update amount calculation portion 54, for reception signals X(n) which cause residue signals e(n). The multiplier-accumulator 43 of the FIR filter portion 41 can then generate a pseudo-echo signal Y(n) for each reception signal X(n) while changing the tap coefficient from one moment to the next. For example, using a digital signal processor (DSP) system, the complicated functions of each portion can be realized through publicly-known digital signal processing techniques. In this case, a simple configuration is adopted for the delay taps 51, which also serve as the variable register 42. Below, the respective processing stages are briefly explained.

The train of reception signals X(n) is input to the FIR filter portion 41 and coefficient update portion 50. In the FIR filter portion 41, these are sequentially guided into the variable register 42, as shown in FIG. 4A, to become a train of delay sample signals at time n (in the figure, from X(0) to X(N−1)). As a result, a pseudo-echo signal Y(n) is generated by the multiplier-accumulator 43 using the following equation (1). N−1 memory cells are provided in the variable register 42, and x(0) is directly multiplied.

$$Y(n)=\Sigma X(n-k) \times Hk(n) \tag{1}$$

That is, when the product of the train of delay sample signals X(n) of the variable register 42 and the tap coefficients Hk(n) is accumulated over the range k=0 to N−1, the multiply-accumulate sum can be taken as the pseudo-echo signal Y(n).

Hence by updating the tap coefficients Hk(n) of the coefficient register 44 from moment to moment while monitoring the power of the reception signal X(n), an adaptive filter 40 for the echo path can be configured. Hence in the coefficient update portion 50, the following equation (2) is used by the power calculation portion 52 to calculate the power signal POWER(n).

$$POWER(n)=\Sigma(X(n-i) \times X(n-i)) \tag{2}$$

That is, each time a new delay sample signal X(n) is input, multiply-accumulate is performed over the range i=0 to N−1, as shown in the time chart of FIG. 4B, and the result taken to be the reception signal power. As with the variable register 42, the delay taps 51 are provided with N−1 memory cells.

Next, in the divider 53, the reciprocal IAEP1 of the power signal POWER(n) is calculated for each delay sample signal X(n) using the following equation (3). Here the constant α is taken to be a constant value which determines the speed of convergence of the echo canceling function, and is in the range 0<α<1.

$$IAEP1=(\alpha/POWER(n)) \quad (3)$$

In the update amount calculation portion 54, the calculated result of this equation (3) is substituted into the following equation (4) to calculate the tap coefficients Hk(n) of the FIR filter 41.

$$Hk(n+1)=Hk(n)+IAEP1 \times e(n) \times X(n-i) \quad (4)$$

The method of equation (3) is widely known as the NLMS (normalized LMS) method. By means of this NLMS method, update amounts for tap coefficients Hk(n) can be calculated for each delay sample signal X(n), and so a pseudo-echo signal Y(n) can be determined while causing the adaptive filter 40 to adapt closely to the transmission characteristics of the echo path.

However, in the above echo canceller example of the prior art, the tap coefficients Hk(n) are calculated using equations (3) and (4), and so the following problems arise from the large amount of calculations.

In general DSPs, although the amount of processing (number of operations) in multiply-accumulate processing is small, division requires several times the processing of multiplication and accumulation. Moreover, in division equations often limits are placed (regarding range, sign, and so on) on the numerator or denominator, and in such cases division preprocessing must be performed, and measures taken to ensure that the numerator and denominator are within limits which depend on each DSP. Because this preprocessing is also executed by the DSP as part of the division operation, there is the problem that even a single division operation can impose an extremely large burden on the DSP.

A device such as an echo canceller which performs signal processing for such for example as audio communication must execute realtime processing of signals occurring in realtime. Hence a DSP must complete all necessary signal processing within the allowed time range and within the allowed calculation amounts. However, if division is performed each time a delay sample is introduced, a large part of the allowed calculation amount will be consumed by division operations. Hence there is the problem that a large calculation capacity cannot be left for the above-described vital multiply-accumulate operations.

Consequently, an echo canceller is desired which can rationally resolve these problems, and reduce the amount of power signal division calculations, when calculating the update amounts of tap coefficients in an adaptive filter.

SUMMARY OF THE INVENTION

In order to solve these problems, the echo canceller of this invention is an echo canceller which forms a pseudo-echo signal from a reception signal using an adaptive filter, subtracts the pseudo-echo signal from the transmission signal using a subtractor, and eliminates the echo component in the transmission signal. The echo canceller of this invention has a holding portion to hold at least a communication frame length's worth of the reception signal; a power calculation portion which determines the power in each communication frame based on the reception signal held in the holding portion; a divider which divides the echo-division residue signal for each sample of the communication frame output from the above subtracter, by the power determined for each communication frame; and an update portion which updates the tap coefficients of the above adaptive filter according to output signals from the divider.

BRIEF DESCRIPTION OF THE DRAWINGS

The foregoing and other objects, features and advantages of the present invention will be better understood from the following description taken in connection with the accompanying drawings, in which:

FIG. 6A and FIG. 6B are time charts showing one example of the characteristic operation of the first embodiment;

FIG. 10A and FIG. 10B are time charts showing one example of the characteristic operation of the third embodiment;

DESCRIPTION OF THE PREFERRED EMBODIMENTS

Figure 1:
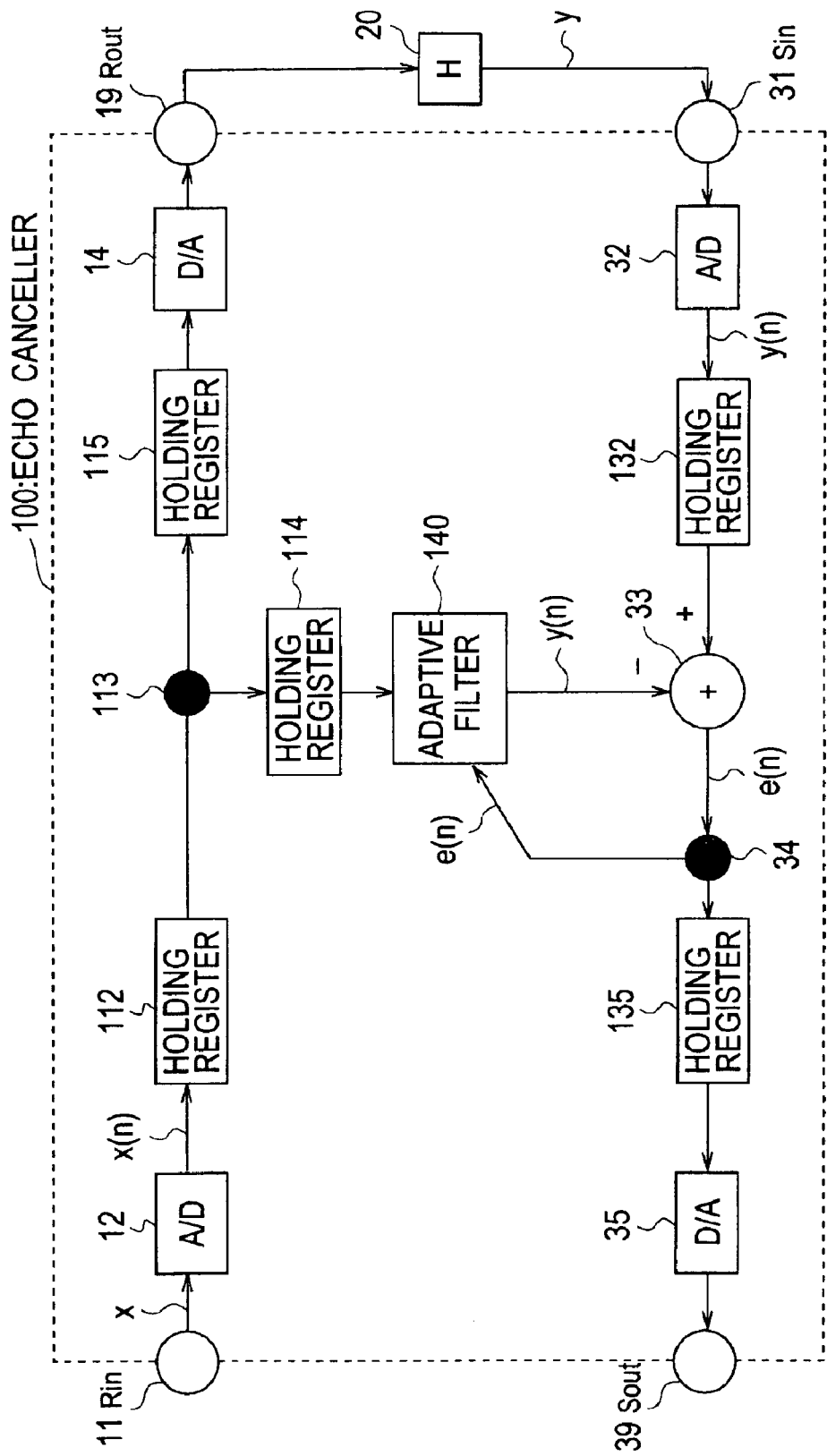
FIG. 1 is an explanatory figure showing an example of the configuration of a first embodiment.
Figure 2:
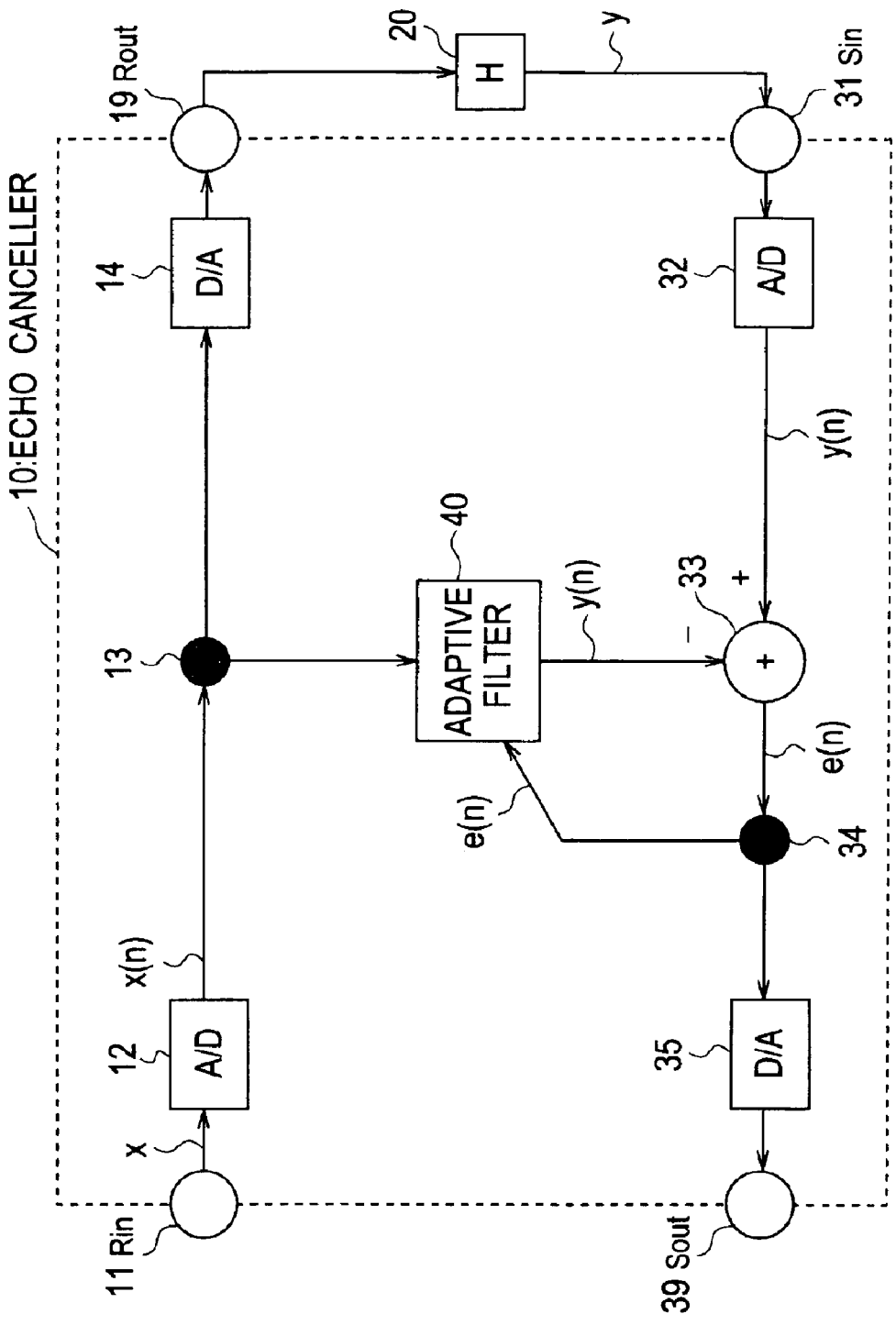
FIG. 2 is an explanatory figure showing one example of a conventional echo canceller.
Figure 3:
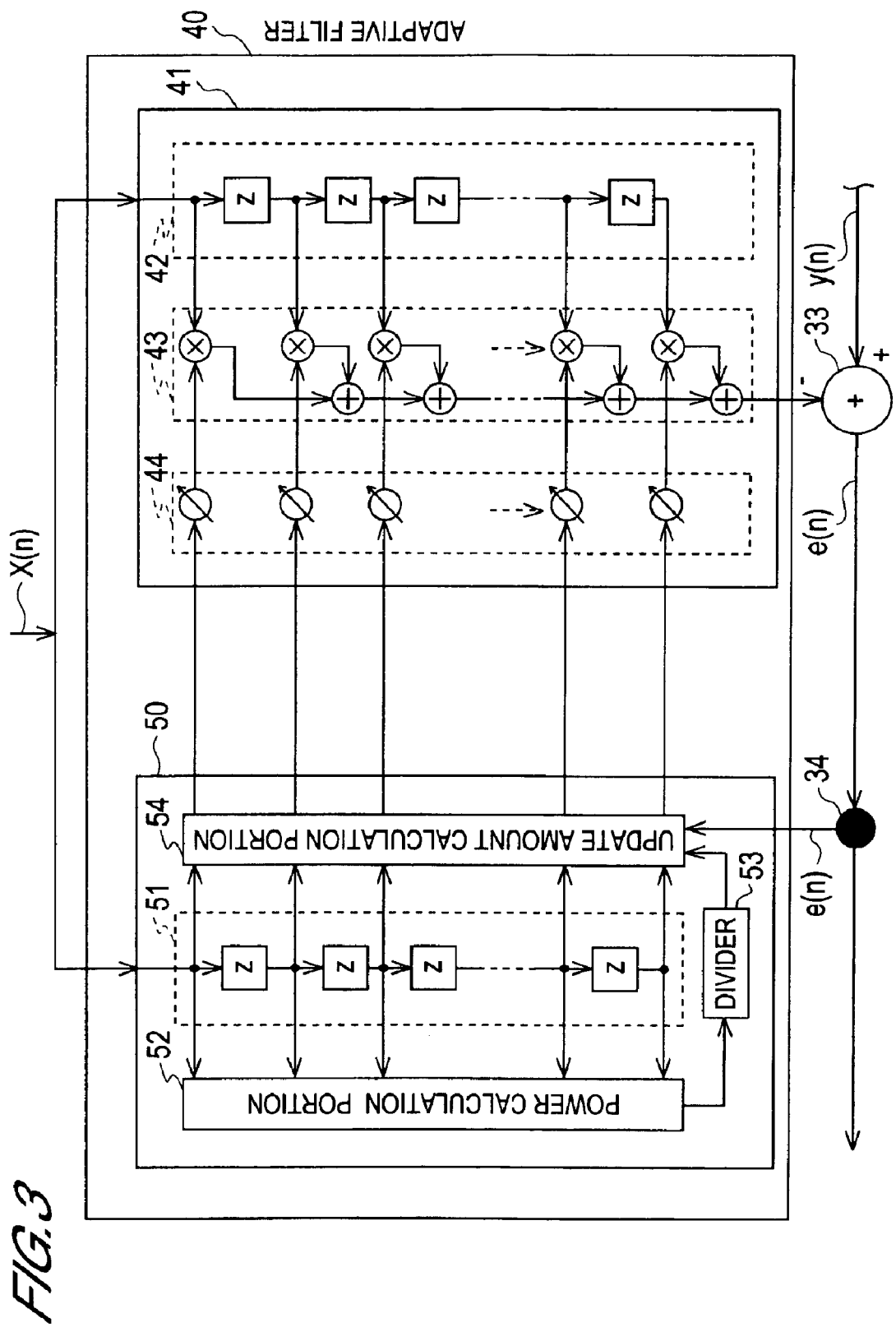
FIG. 3 is a block diagram showing the configuration of the adaptive filter in FIG. 2.
Figure 4A:
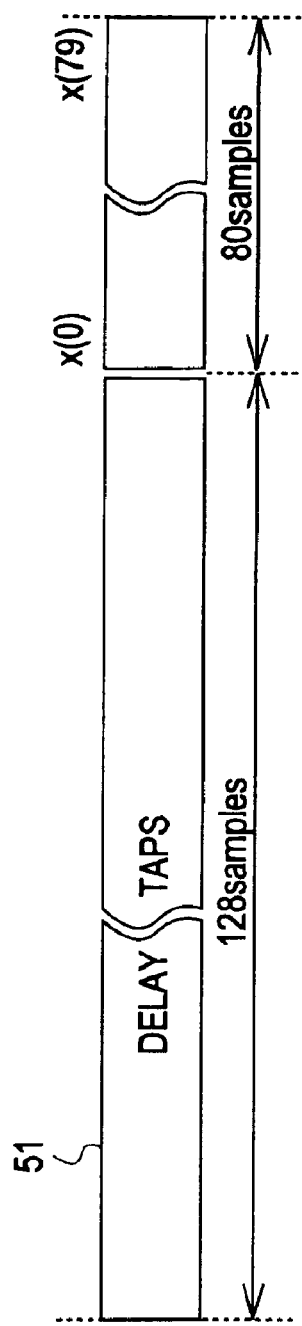
FIG. 4A and FIG. 4B are time charts showing the operation of the adaptive filter in FIG. 2.
Figure 4B:
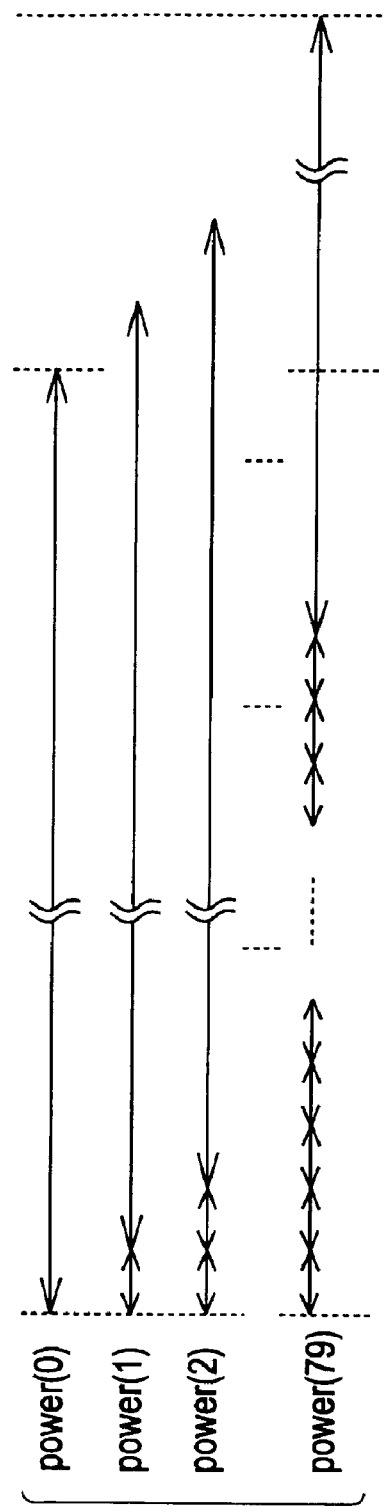

Below, examples of embodiments of the echo canceller of this invention, realized in a digital signal processor (DSP) system, is described in detail, referring to the drawings. Constitutional parts which are similar to constitutional parts in conventional examples are assigned the same symbols, and detailed explanations thereof are omitted.

(A) First Embodiment (A-1) Configuration of the First Embodiment

The echo canceller of the first embodiment is a device having a holding register for the delay sample signal train in the reception input route; its functions are indicated in the block diagram of FIG. 1.

In FIG. 1, this echo canceller 100 has a reception signal route and a transmission signal route. The reception signal route comprises a reception input terminal Rin 11, connected to an exchange network; an analog/digital (A/D) converter 12 for reception signals; a holding register 112 for a train of digital reception signals X(n); an input reference point 113 for an adaptive filter 140, described below; separate holding registers 114, 115 for similar trains of reception signals X(n); a digital/analog (D/A) converter 14; and a reception output terminal Rout 19.

The transmission signal route comprises a transmission input terminal Sin 31; another A/D converter 32; still another holding register 132; an adder 33 which adds pseudo-echo signals Y(n) from the adaptive filter 140; an output detection point 34 for residual echo difference (residue) signals e(n); still another holding register 135; another D/A converter 35; a transmission output terminal Sout 39; and an adaptive filter 140 having a prescribed adaptation algorithm. Conversion of signals from a four-line circuit network to a two-line circuit network is down via a hybrid transformer 20.

The four holding registers 112, 115, 132, 135 store one frame's worth of the introduced train of digital reception signals X(n), or of the introduced transmission signals on which a train of echo signals y(n) is superposed, and also send these serially in the order of their introduction. This configuration is also suitable for requests for audio processing in frame units, described below; the holding register 114 functions to cancel time delays arising in the holding register 115. If each of these memory cells is provided in nearly equal numbers, sharing of hardware elements is possible; for example, 80 samples may be used, but the number of samples is not limited to this.

Figure 5:
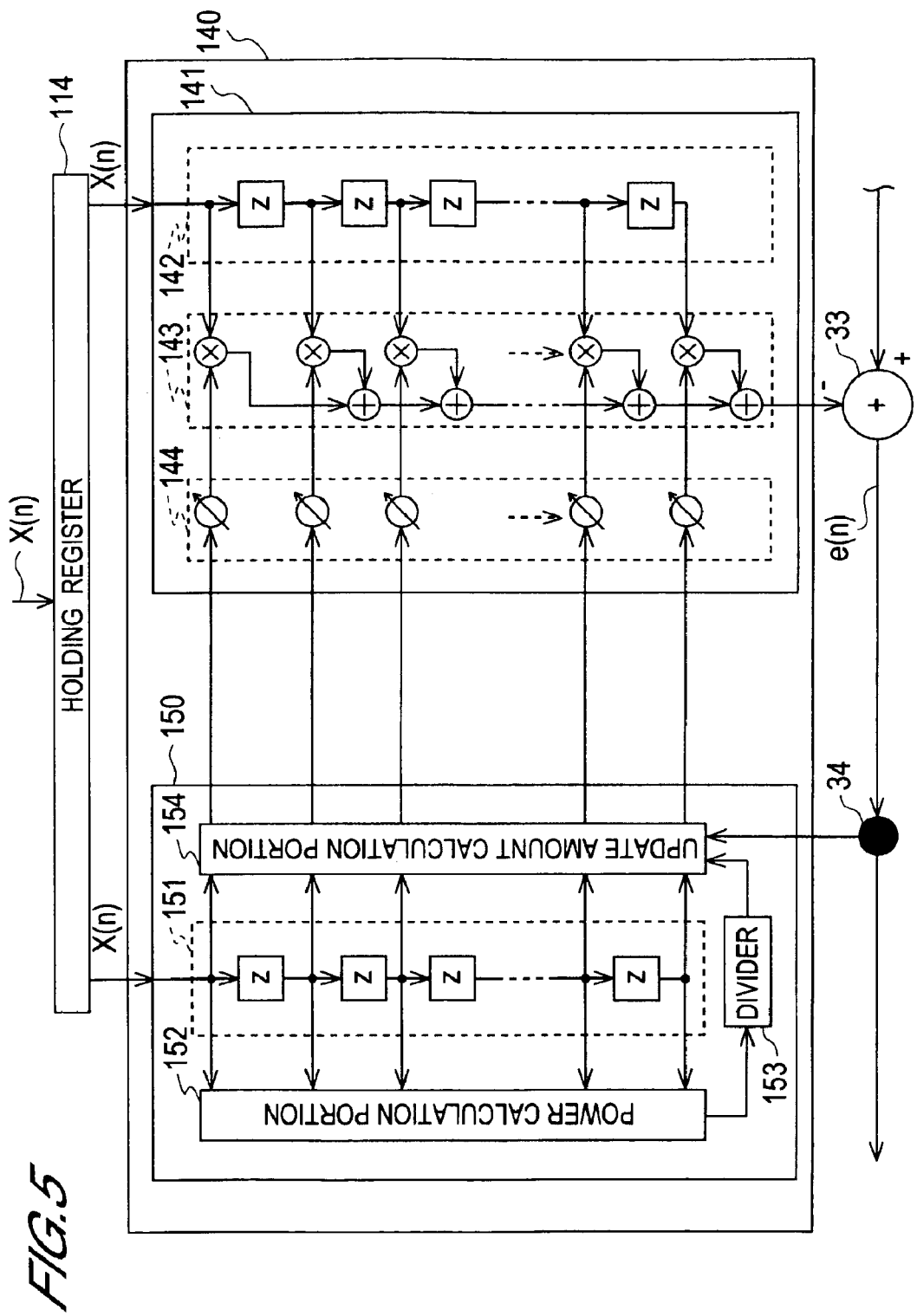
FIG. 5 is a block diagram showing one example of the configuration of the first embodiment.

The adaptive filter 140 is a filter having a circular FIR filter portion 141, and a coefficient update portion 150 for the FIR filter tap coefficients; functions are shown in the block diagram of FIG. 5. For example, the adaptive filter may be realized using a digital signal processor (DSP) system. The coefficient update portion 150 has delay taps 151 for the reception signal X(n) train, a power calculation portion 152 which calculates in frame units, a divider 153 using the power signal, and an update amount calculation portion 154 for each tap coefficient. The coefficient update portion is similar to the above-described example of conventional coefficient update portions, except for differences in some of the functions of the power calculation portion 152. The delay taps 151 can also be used as the variable register 142 of the FIR filter portion 141; for example, there may be 128 taps.

(A-2) Operation of the First Embodiment

In this first embodiment, when an audio signal X is input via the reception input terminal Rin 11, the signal is sampled by the A/D converter 12 and input to the holding register 112 as a train of delay sample signals X(n). The holding register 112 stores a train of for example L delay sample signals, X(0) to X(L−1), and sends this as one frame to each of the holding registers 114, 115. From one of the holding registers 115, the audio signal is again restored via the D/A converter 14, and from the other holding register 114, one signal (sample) each of the train of delay sample signals X(1) to X(L), corresponding to a single frame, is sent, and provided for calculation by the FIR filter portion 141 of the adaptive filter 140.

For example, when at time "0" a delay sample signal X(0) is obtained at the A/D converter 12, an echo signal y(0) is obtained at another A/D converter 32 to correspond to this. Similarly, at time "L−1" a train of L delay sample signals X(0) to X(L−1) is held in the holding register 112, and a train of echo signals y(0) to y(L−1) is held in the holding register 132. Next, when the train of delay sample signals X(0) to X(L−1) is transferred from the holding register 112 to the holding registers 114, 115, the train of delay sample signals X(0) to X(L−1) is input to the FIR filter portion 141 and coefficient update portion 150 of the adaptive filter 140 by the holding register 114. In other words, the holding register 114 cancels the time delay of the holding register 115.

At this time, a train of 80 delay sample signals X(J,0) to X(J,79) of the Jth frame is held in the holding register 114, as shown in FIG. 6A; the train of 128 delay sample signals X(n) of the preceding frame is already held in the delay taps 151 of the coefficient update portion 150. In the power calculation portion 152, POWER_BI1(J,0) is calculated from the train of 128 delay sample signals X(n) as shown in FIG. 6B, and the subsequent POWER_BI1(J,1) to POWER_BI1(J,79) are set to the same value.

Restated, in the power calculation portion 152 the power for the train of delay sample signals X(J,0) to X(J,L) is calculated once only for the one frame. However, when J=0, POWER_BI1(J)=0, and in the Jth frame, the total for the kth delay sample signal X(J,k) is equivalent to the (J×L+k)th. The following formula (5) is used to calculate over the range i=0 to N−1 to find POWER_BI1(J). However, when JL−1−i<0, it is assumed that the delay sample signal X(jL−1−i)=0.

$$POWER\_BI1(J)=\Sigma(X(JL-1-i) \times X(JL-1-i)) \quad (5)$$

At the divider 153, IAEP_I1(J) is calculated once only for each frame, using the following equation (6).

$$IAEP\_I1(J)=(\alpha/POWER\_BI1(J)) \quad (6)$$

At the update amount calculation portion 154, the update amounts for tap coefficients are calculated using the following equation (7), and these are used to update the tap coefficients Hk(n) for the FIR filter 141.

$$Hk(n+1)=Hk(n)+IAEP\_I1(J) \times e(n-L) \times X(n-i-L) \quad (7)$$

(A-3) Advantageous Result of the First Embodiment

In this first embodiment, the delay sample signal X(n) train is handled together for each frame, and can be passed to the holding registers 112, 114, 115, and similar, for convenience in audio processing in frame units.

In general, a voice encoder (VOCODER) or similar which encodes delay sample signals for audio signals is installed for echo canceller post-processing in circuits for communication with exchange networks. In recent years, there has been an increased in VOCODERs adopting a design in which delay sample signal groups are received in frame units and processed; consequently, an audio CODEC is often inserted between the above-described A/D converter 12 and holding register 112. Hence the delay sample signal X(n) group is similarly passed as a single whole frame.

The coefficient update portion 150 of the adaptive filter 140 has delay taps 151 which already have memory cells corresponding to the tap coefficients of the FIR filter 141. Hence the capacity for holding the delay sample signal group X(0) to X(L−1) is larger than in conventional examples by the amount of the holding register 114. For this reason, if POWER_BI1(J,0) is calculated just once from the first delay sample signal X(J,0) for the Jth frame, subsequent calculation results can be used as representative values. Hence the number of power calculations and divisions can be reduced to 1/80 (that is, 1/(frame length)). For example, the calculation amount for an ordinary DSP could be reduced by approximately 1 MIPS (one million calculations per second).

(B) Second Embodiment (B-1) Configuration of the Second Embodiment

Figure 7:
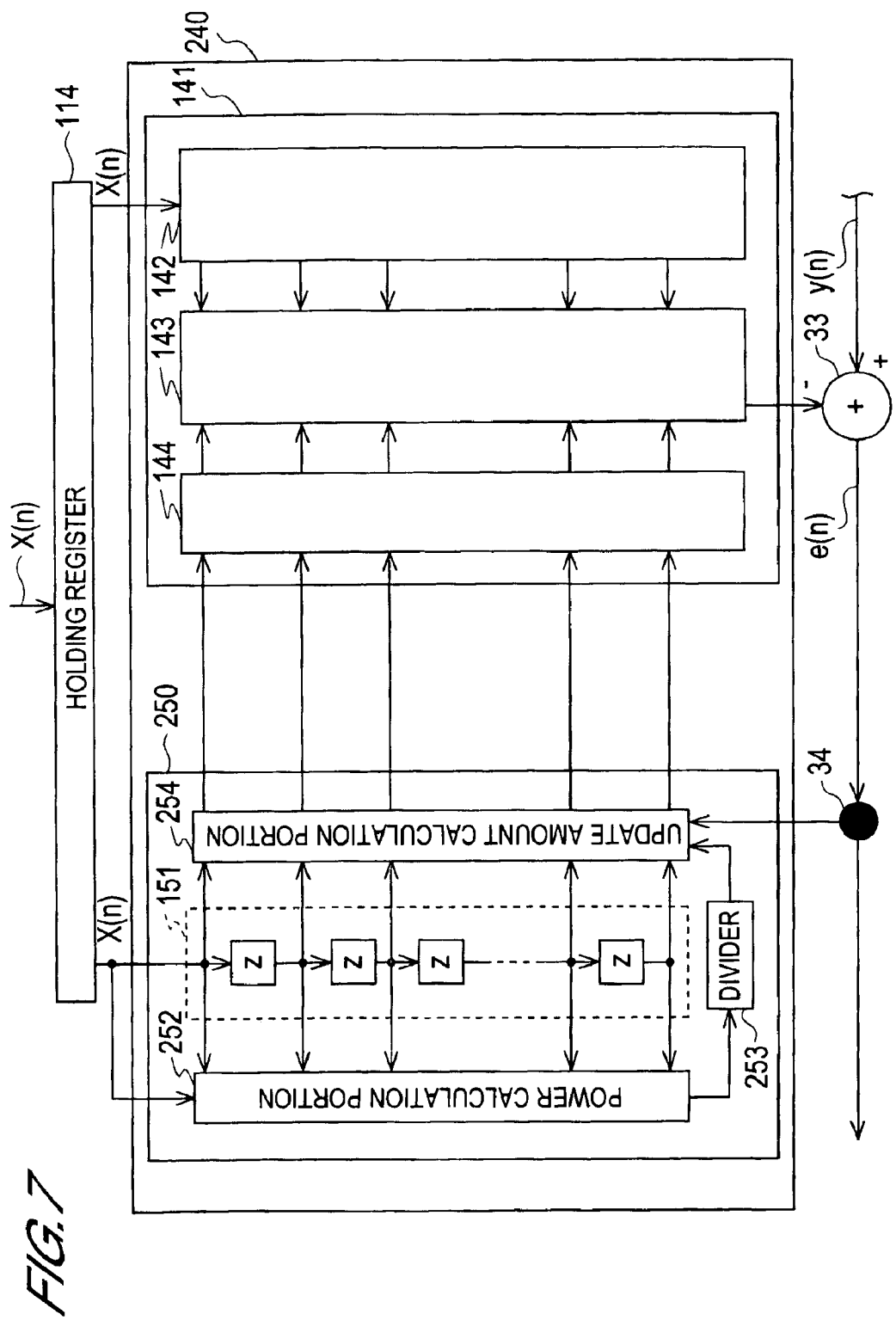
FIG. 7 is a block diagram showing one example of the configuration of a second embodiment.

The second embodiment is an echo canceller with improved echo elimination processing speed through a separate adaptive filter 240. A delay sample signal X(n) train is introduced into this separate adaptive filter 240 from a holding register 114, and the power signal is determined by a separate power calculation portion 252; otherwise, the device is similar to that of the first embodiment. An example of the functions of the adaptive filter 240 is shown in the block diagram of FIG. 7.

(B-2) Operation of the Second Embodiment

Figure 8A:
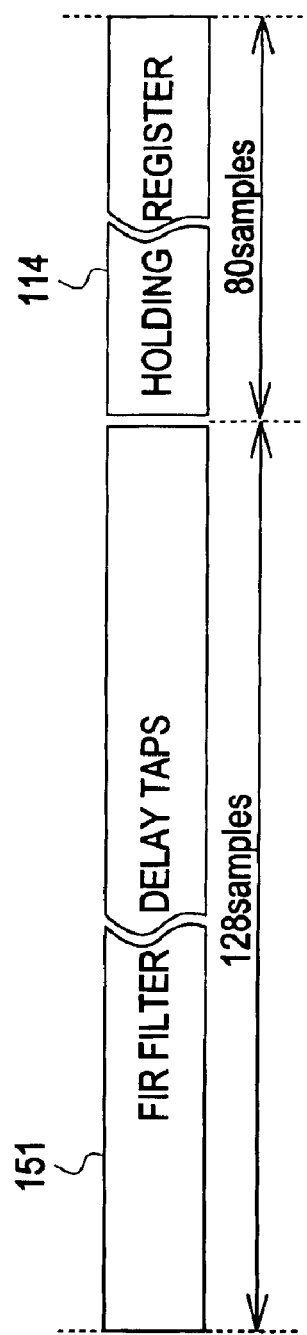
FIG. 8A and FIG. 8B are time charts showing one example of the characteristic operation of the second embodiment.

In the second embodiment, a train of 80 delay sample signals X(J,0) to X(J,79) is introduced into and stored in the holding register 114 for each frame of reception signals, as shown in FIG. 8. From a train of 128 delay sample signals including the above signals, the power signal POWER_BL (J,n) is calculated by the power calculation portion 252.

Figure 8B:
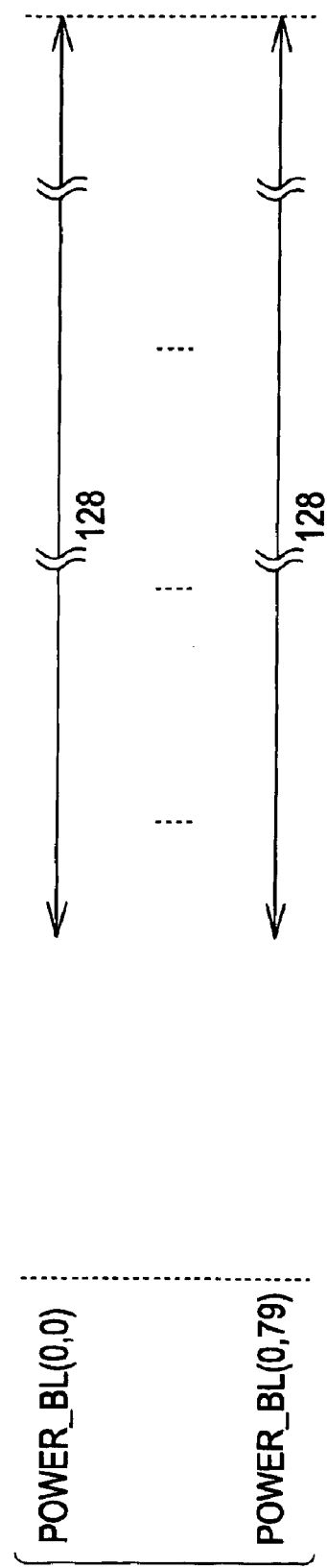

POWER_BL(J,0) to POWER_BL(J,79) are set to the same value, as shown in FIG. 8B, and calculations are performed once only for one frame. At this time, if POWER_BL(J,n) is set equal to POWER_BL(J), these values are calculated using the following equation (8). However, when (J+1)L−1−i<0, it is assumed that the delay sample signal X((J+1)L−1−i)=0.

$$POWER\_BL(J)=\Sigma(X((J+1)L-1-i) \times X((J+1)L-1-i)) \quad (8)$$

Next, the divider 253 calculates IAEP_BL(J) using the following equation (9).

$$IAEP\_BL(J)=(\alpha/POWER\_BL(J)) \quad (9)$$

The update amount calculation portion 254 then uses the following equation (10) to calculate the tap coefficients Hk(n+1), and these are used to update the tap coefficients Hk(n) of the FIR filter 141.

$$Hk(n+1)=Hk(n)+IAEP\_BL(J) \times e(n-L) \times X(n-i-L) \quad (10)$$

(B-3) Advantageous Result of the Second Embodiment

In this second embodiment, the power signal is calculated including the delay sample signal immediately after introduction to the holding register 114, so that the tap coefficients can be made to respond immediately to the delay sample signal train. Hence the calculation amount is reduced, and even when the power differs greatly among delay sample signal trains, a response speed comparable to that of the above-described conventional example can be realized.

(C) Third Embodiment (C-1) Configuration of the Third Embodiment

Figure 9:
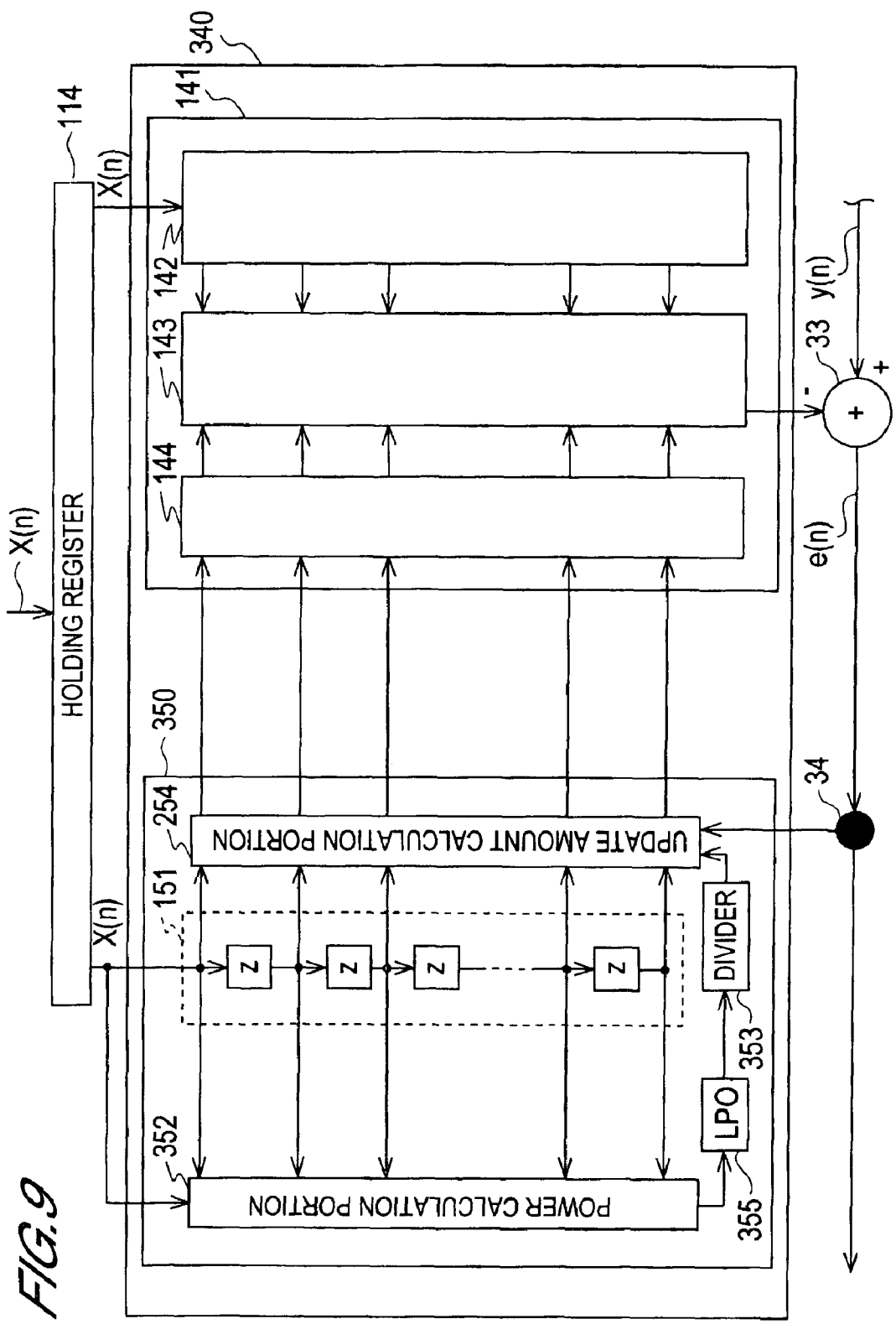
FIG. 9 is a block diagram showing one example of the configuration of a third embodiment.

The third embodiment is an echo canceller in which still another adaptive filter 340 prevents biasing of the echo elimination performance relative to the preceding and following frames; by means of a smoother (LPO) 355 added to the previous stage of the coefficient update portion 350 of this separate adaptive filter 340, the power signal is smoothed; otherwise, the device is similar to that of the second embodiment. An example of the functions of the adaptive filter 340 is shown in the block diagram of FIG. 9.

(C-2) Operation of the Third Embodiment

In this third embodiment, the power signal POWER_BL (J) calculated by the power calculation portion 352 is introduced into the smoother 355, and smoothing is performed using the following equation (11). Here δ is a constant in the range 0<δ<1 which determines the extent of the smoothing; the larger the value of δ, the faster the changes in POWER_BL(J) that can be followed, and the smaller the value, the more moderately changes are followed.

$$POWER\_BL\_LPO(J)=(1-\delta) \times POWER\_BL\_LPO(J)+\delta \times POWER\_BL(J) \quad (11)$$

Next, the output signal from the smoother 355 is introduced into the divider 353, and IAEP_BL_LPO(J) is calculated using the following equation (12).

$$IAEP\_BL\_LPO(J)=(\alpha/POWER\_BL(J)) \quad (12)$$

In the update amount calculation portion 254, the following equation (13) is used to calculate the tap coefficients Hk(n+1) from this IAEP_BL_LPO(J), and the result is used to update the tap coefficients Hk(n) of the FIR filter 141.

$$Hk(n+1)=Hk(n)+IAEP\_BL\_LPO(J) \times e(n-L) \times X(n-i-L) \quad (13)$$

(C-3) Advantageous Result of the Third Embodiment

In this third embodiment, even when a specific delay sample signal X(n) in the Jth frame is not employed in power signal calculations, it can be used for the J−1th frame. Division is performed once for one frame, and throughout this one frame the same IAEP_BL_LPO(J) can be used.

In general, the intensity of the audio signal changes from moment to moment, so that the power signal POWER(n) for each delay sample signal may by chance undergo great changes locally within a single frame, as shown in FIG. 10A. In the equation (13) for division using the adaptive algorithm NLMS of the delay sample group signal X(n) for the new frame, the sum of squares (that is, the power) of the delay sample group signal X(n) corresponding to the number of memory cells in the delay taps 151 is used in the denominator.

In such a case, if the power signals for each of the 128 delay sample signals X(n) including the new frame are represented by a single representative value POWER_BL (J), by eliminating the above-described local changes, this value is estimated to be smaller than the actual power signal. If division is then performed, the denominator takes on a smaller value than the actual power signal POWER(n), so that the reciprocal value, IAEP_BL(J), becomes relatively larger, and calculations result in an update amount which is larger than necessary.

Hence during the interval A shown in FIG. 10A, a pseudo-code Y(n) which ignores the delay sample signal X(n) train is calculated. For example, if an audio signal happens to be divided into the next frame with timing immediately following the interval A, by the sudden change (decrease) of the tap coefficients, there is the possibility that echo elimination performance for this frame may be sharply degraded.

Hence complementary weighting of the large-valued power signal POWER_BL(J−1) and the relatively small-valued power signal POWER_BL(J) is performed, and smoothing is performed so that temporary large values do not suddenly appear. Hence no matter at what moment the audio signal is divided into frames, division can be performed after rendering smooth the magnitude of the power signals for the surrounding frames. Consequently there is no temporary degradation of the echo elimination performance, and an echo canceller which is related to the relative intensities of frames can be realized. For example, if δ=0.6, performance is sufficient for practical use; however, this invention is not limited to this value.

(C-4) Variation of the Third Embodiment

In the third embodiment, calculations were performed for smoothing of the surrounding two power signals; as a variation of this, an arbitrary number of three or more power signals may be used, and by this means the echo elimination performance can be smoothed over a still broader range.

(D) Fourth Embodiment (D-1) Configuration of the Fourth Embodiment

Figure 11:
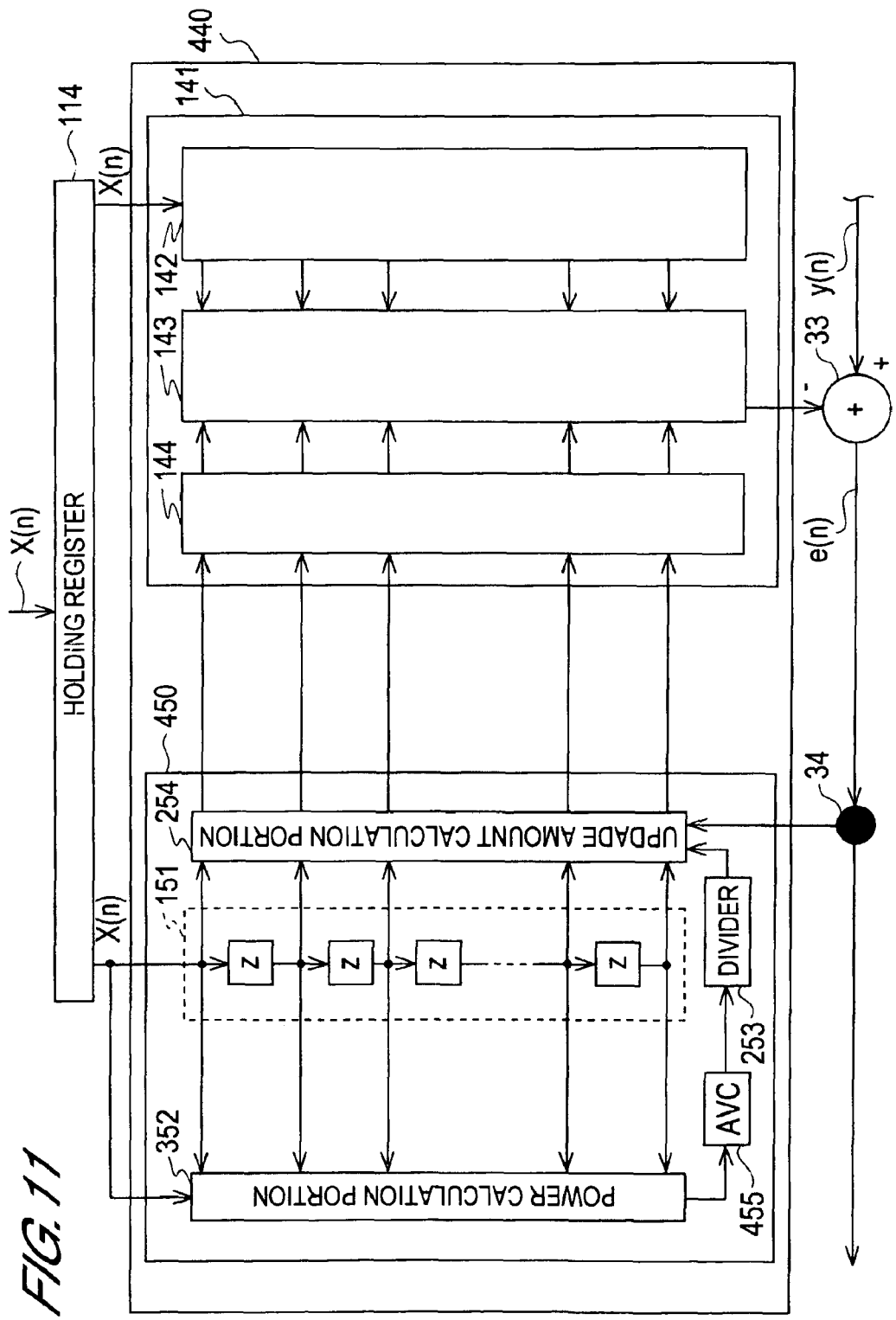
FIG. 11 is a block diagram showing one example of the configuration of a fourth embodiment.

The fourth embodiment is an echo canceller in which still another adaptive filter 440 averages the echo elimination intensity; except in that the smoother of the third embodiment is replaced with an averager (AVC) 455 which calculates the average value of the power signal, the device is similar to that of the third embodiment. An example of the functions of the adaptive filter 440 is shown in the block diagram of FIG. 11.

(D-2) Operation of the Fourth Embodiment

In the fourth embodiment, the output signal from the power calculation portion 352 is input to the averager 455, and the following equation (14) is used to calculate the power signal POWER_BL_AVC(J); the result is sent to the divider 253.

$$POWER\_BL\_AVC(J)=(POWER\_BL(J-1)+OIWER\_BL(J))/2 \quad (14)$$

Next, the divider 253 uses the following equation (15) to determine IAEP_BL_AVC(J) and calculates the tap coefficient Hk(n+1); this is used to update the tap coefficient Hk(n) of the FIR filter 141.

$$IAEP\_BL\_AVC(J)=(a/POWER\_BL\_AVC(J)) \quad (15)$$

(D-3) Advantageous Result of the Fourth Embodiment

In the fourth embodiment, by performing averaging in the averager 455 with the same weighting for power signals in immediately neighboring frames, the effect of smoothing in the fourth embodiment can be made specialized.

(D-4) Variation of the Fourth Embodiment

The fourth embodiment was made specialized by a simple arithmetic averaging; as a variation on this, the middle frame of three frames may be made continuous by means of an interpolation function other than arithmetic averaging over the surrounding frames.

(E) Fifth Embodiment (E-1) Configuration of the Fifth Embodiment

Figure 12:
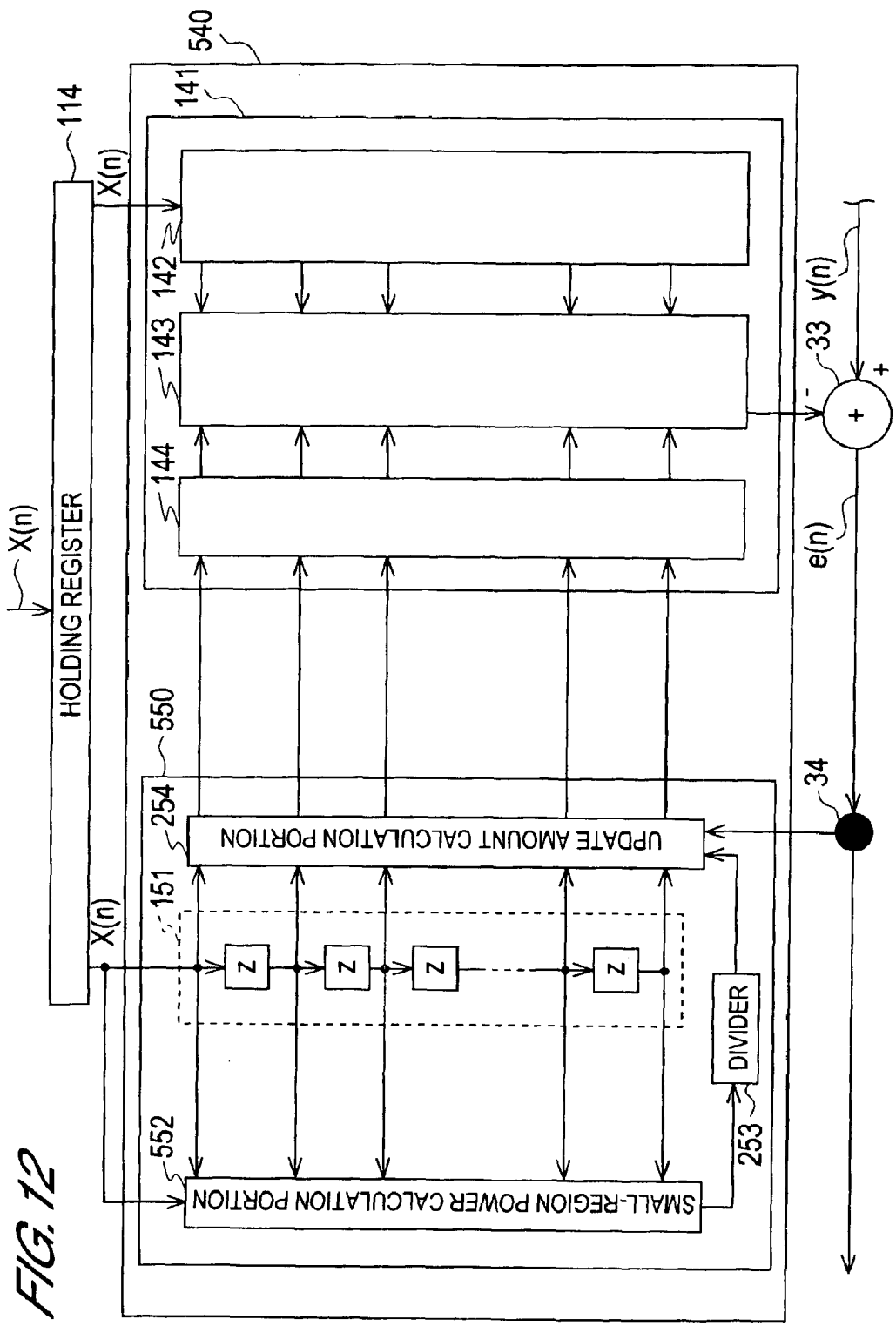
FIG. 12 is a block diagram showing one example of the configuration of a fifth embodiment.

The fifth embodiment is an echo canceller, in which still another adaptive filter 540 prevents bias in the echo elimination performance for both the preceding and following frames. Except for the fact that power signals are determined with the delay taps 151 subdivided into a plurality of small region groups by a small-region power calculation portion 552, which replaces the power calculation portion of the second embodiment, the device is similar to that of the second embodiment. The block diagram of FIG. 12 shows one example of the functions of the adaptive filter 540.

The small-region power calculation portion 552 prepares a train of delay sample signals X(n) corresponding to the holding capacity which is the sum of the delay taps 151 and the holding register 114, divides this into at least three small regions (in order, A, B, C), and calculates the power signals for each in order. The number of these small regions is not limited to three, but may be four or more.

(E-2) Operation of the Fifth Embodiment

In the fifth embodiment, 128 delay sample signals X(n) are input into and stored in the delay taps 151, and 80 delay sample signals X(n) are input into and stored in the holding register 114. When performing power calculations for the Jth frame, the 128 signals of the delay taps 151 may for example be divided with the 80 signals corresponding to the holding capacity of the holding register 114 as small region A, and the remaining 48 signals as small region B.

The power signal POWER_SEC_A(J) is calculated over the range i=207 to 128 using the following equation (16), and POWER_SEC_B(J) is calculated over the range i=127 to 80 using the following equation (17). The 80 signals of holding register 114 are taken to be small region C, and the power signal POWER_SEC_C(J) is calculated over the range i=79 to 0 using the following equation (18). As a result, a train of a total of 208 delay sample signals X(n) is processed.

$$POWER\_SEC\_A(J)=\Sigma(X(n-i) \times X(n-i)) \quad (16)$$

$$POWER\_SEC\_B(J)=\Sigma(X(n-i) \times X(n-i)) \quad (17)$$

$$POWER\_SEC\_C(J)=\Sigma(X(n-i) \times X(n-i)) \quad (18)$$

Next, the small-region power calculation portion 552 calculates POWER_BL(J) using the following equation (19). That is, the values of the power signals POWER_SEC_A and POWER_SEC_C are compared, and the power signal with the larger value is added to the power signal POWER_SEC_B. The function MAX(x,z) is a function which selects the larger of x and z.

$$POWER\_BL(J)=POWER\_SEC\_B(J)+MAX(POWER\_SEC\_C(J), POWER\_SEC\_A(J)) \quad (19)$$

The power signal POWER_BL(J) resulting from addition is input to the divider 253, and as a result the above-described division is performed.

(E-3) Advantageous Result of the Fifth Embodiment

In this fifth embodiment, the power signal which is the larger of the regions A and C is selected, and this is added to the power signal for region B before performing division, so that there is no longer degradation with time in the echo elimination performance.

Figure 13:
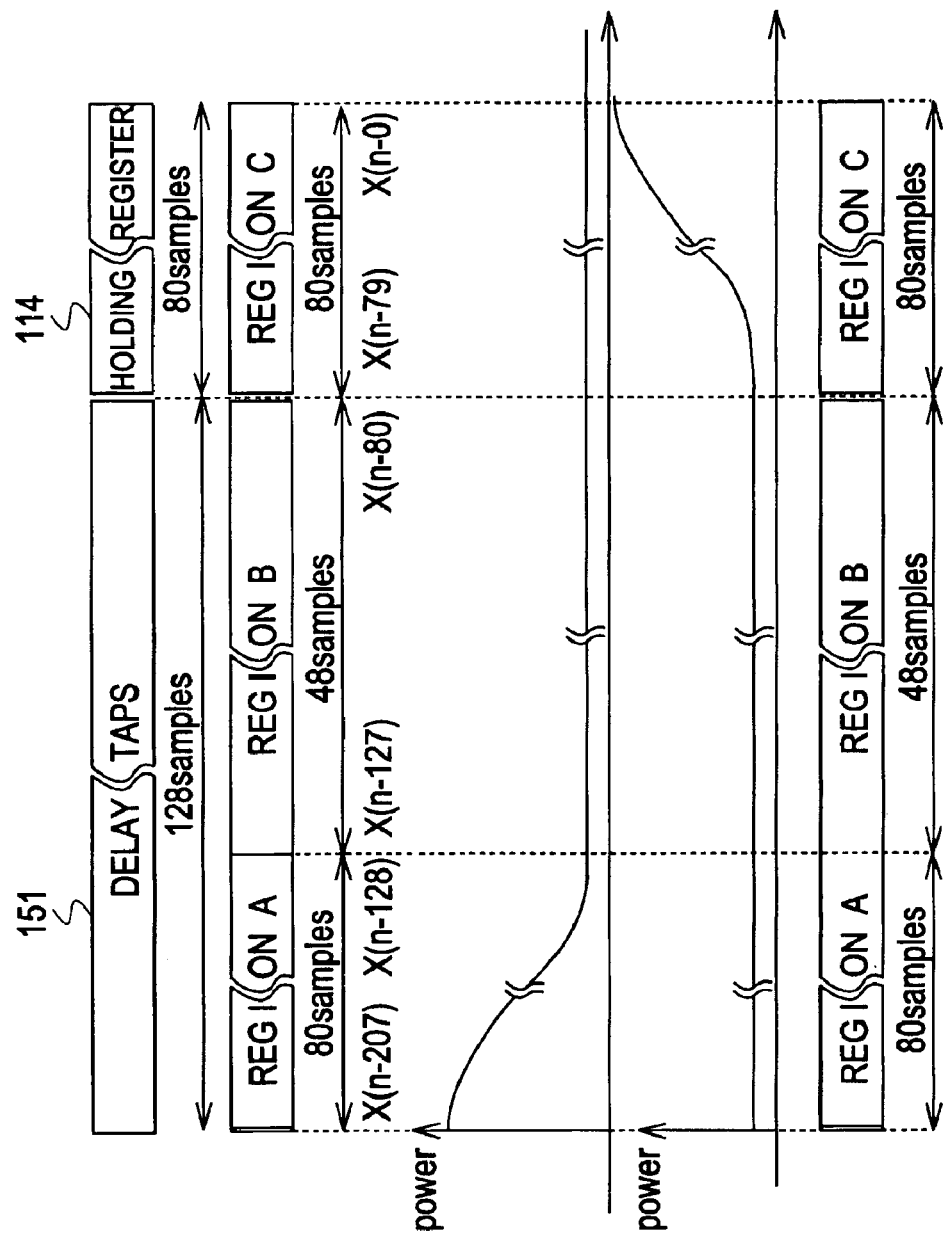
FIG. 13 is a time chart showing one example of the characteristic operation of the fifth embodiment.

In general, the intensity of an audio signal undergoes changes like those shown in FIG. 13 in the regions A and C of the delay sample group signal X(n). That is, the flat region B with little change is enclosed in the center, and large power signal groups appear in the intervals earlier or later than this. Depending on the position of frame division of the audio signal, when the regions A and B are input to the coefficient update delay taps 151, the region C may be held in the holding register 114.

In order to perform processing conforming to the adaptive algorithm NLMS, the number of samples is made equal to the number of delay taps 151 (in the figure, 128), and at this time it is desirable that division by the power signal be performed. Hence when using the power signals found for the regions A and B in division, the 80 samples' worth of delay sample signals X(n) held in the holding register 114 must be ignored.

For this reason, the power signal found from the delay taps 151 differs greatly from the power signal for the following frame (region C), because echo elimination processing cannot proceed smoothly.

(F) Sixth Embodiment (F-1) Configuration of the Sixth Embodiment

Figure 14:
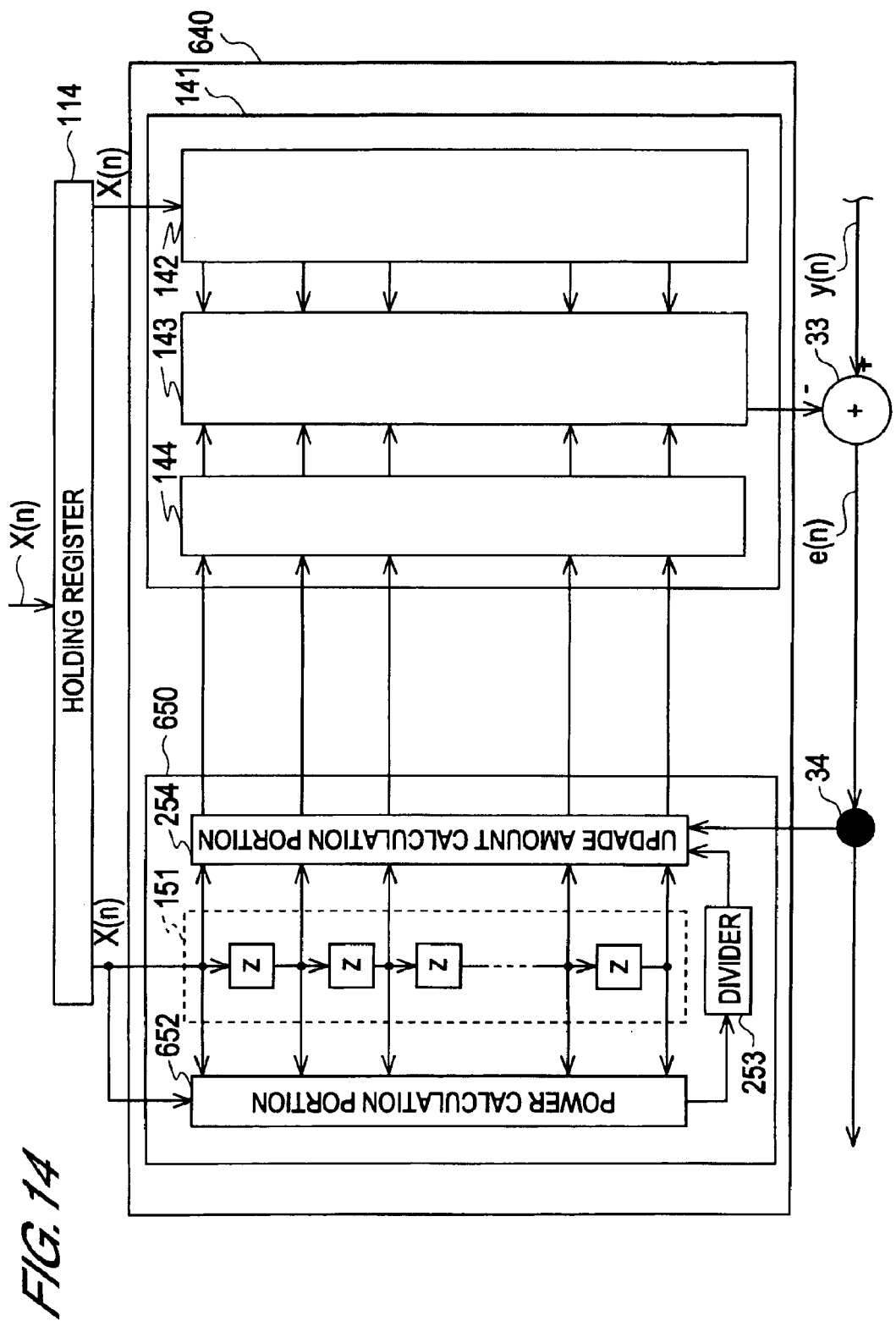
FIG. 14 is a block diagram showing one example of the configuration of a sixth embodiment.

The sixth embodiment is an echo canceller in which still another adaptive filter 640 prevents biasing of the echo elimination performance over the entirety of the preceding and following frames; by means of another power calculation portion 652 which replaces the power calculation portion of the second embodiment, the power signal is determined for two frames together, the device is similar to that of the second embodiment. An example of the functions of the adaptive filter 640 is shown in the block diagram of FIG. 14.

This separate power calculation portion 652 averages the entire train of delay sample signals X(n) corresponding to the total holding capacity of the delay taps 151 and holding register 114, and calculates the power signal corresponding to the number of memory cells in the delay taps 151.

(F-2) Operation of the Sixth Embodiment

In this sixth embodiment, the power calculation portion 652 uses the following equation (20) to calculate the power signal POWER_ALL(J) for the delay sample group signals X(n) over the entirety of two frames.

$$POWER\_ALL(J)=\Sigma(X(n-i)\times X(n-i)) \quad (20)$$

Then, the following equation (21) is used to correct the calculated power signal POWER_ALL(J), and the adapted algorithm NLMS is used to calculate the power signal POWER_BL(J) corresponding to the desired number of delay taps 151 (in the FIG. 128).

$$POWER\_BL(J)=POWER\_ALL(J)\times(128/207) \quad (21)$$

Here the number of delay sample signals (207) for the delay taps 151 and holding register 114 is determined in advance, and by setting this number in the power calculation portion 652, a constant (128/207) can be set initially as a calculation coefficient, thus simplifying the equation (21) to the equation (22) shown below. This POWER_BL(J) is input to the divider 253 to perform division.

$$POWER\_BL(J)=POWER\_ALL(J)\times 0.618 \quad (22)$$

(F-3) Advantageous Result of the Sixth Embodiment

In the sixth embodiment, even if relatively high power levels occur at the beginning of the preceding frame and at the end of the following frame, correction is performed after calculating the power signal for the delay sample signal X(n) train for the entirety of both frames, so that an accurate value which is close to the power actually occurring in the two frames is obtained, and it is still more difficult for temporary degradation to occur in the echo elimination performance when this value is used in division.

Compared with the fifth embodiment, there is no need for the above-described function MAX(x,z) or similar, so that to this extent the calculation amount can be reduced.

(G) Seventh Embodiment (G-1) Configuration of the Seventh Embodiment

Figure 15:
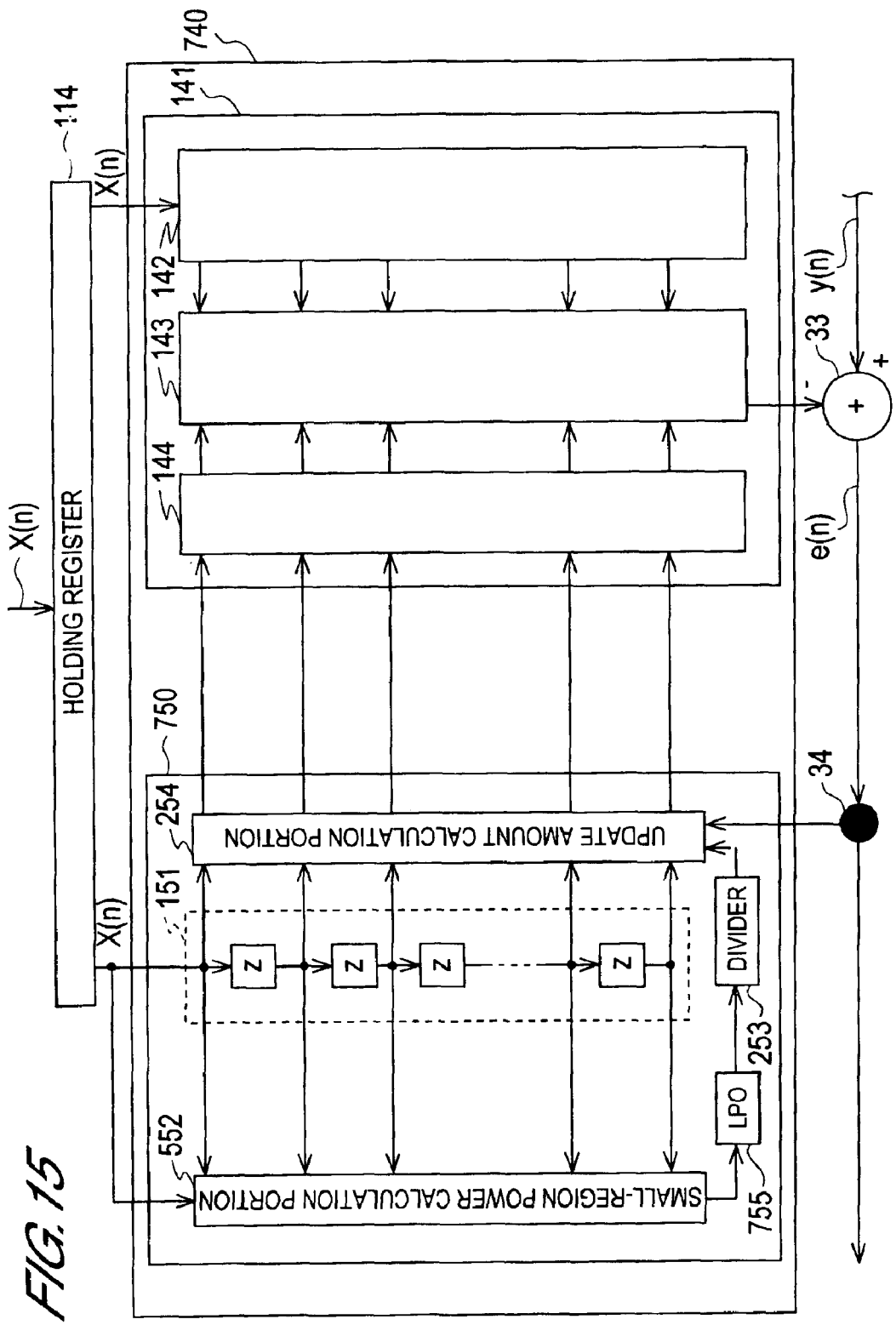
FIG. 15 is a block diagram showing one example of the configuration of a seventh embodiment.

The echo canceller of this seventh embodiment is a device which combines the third and fifth embodiments; except for providing a smoother 755 between the small-region power calculation portion 552 and divider 253 in place of the above-described power calculation portion, it is similar to the device of the third embodiment. An example of the functions of this device is shown in the block diagram of FIG. 15.

(G-2) Operation of the Seventh Embodiment

In the seventh embodiment, not only is the power signal simply weighted and continuous echo elimination with the neighboring frames, preceding and following, effected by the smoother 755; when there is high power in the delay sample signal X(n) train of the following frame, the following frame is also averaged with the further following frame.

(G-3) Advantageous Result of the Seventh Embodiment

By means of the seventh embodiment, an echo canceller can be realized in which echo elimination performance is not degraded, regardless of temporary extreme states in audio signals over three consecutive frames.

(H) Eighth Embodiment (H-1) Configuration of the Eighth Embodiment

Figure 16:
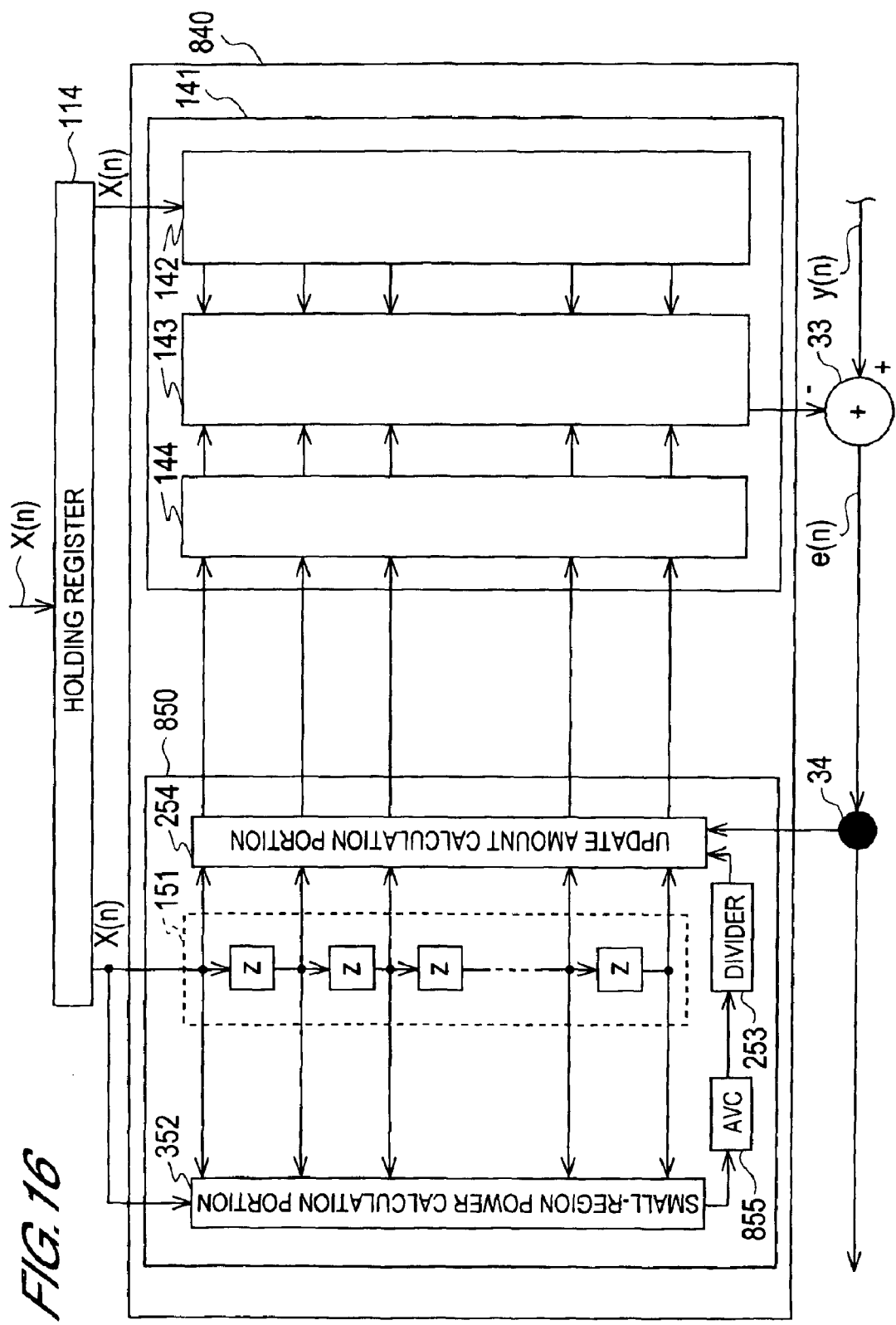
FIG. 16 is a block diagram showing one example of the configuration of a eighth embodiment; and, FIG. 17 is a block diagram showing one example of the configuration of a ninth embodiment.

The eighth embodiment is a device which combines the fourth and fifth embodiments; except for providing a smoother 855 between the divider 253 and the small-region power calculation portion 552 which replaces the above-described power calculation portion, the device is similar to that of the fourth embodiment. An example of the functions is shown in the block diagram of FIG. 16.

(H-2) Operation of the Eighth Embodiment

In the eighth embodiment, the smoother 855 simply averages the power signal over the neighboring (preceding and following) frames, and effects echo elimination in stages; in addition, when there is high power in the delay sample signal X(n) train of the following frame, this following frame is averaged with the further following frame.

(H-3) Advantageous Result of the Eighth Embodiment

By means of the eighth embodiment, an echo canceller can be realized which is specialized for power signal averaging and causes no degradation of echo elimination performance, regardless of temporary extreme states in audio signals over three consecutive frames.

(I) Ninth Embodiment (I-1) Configuration of the Ninth Embodiment

Figure 17:
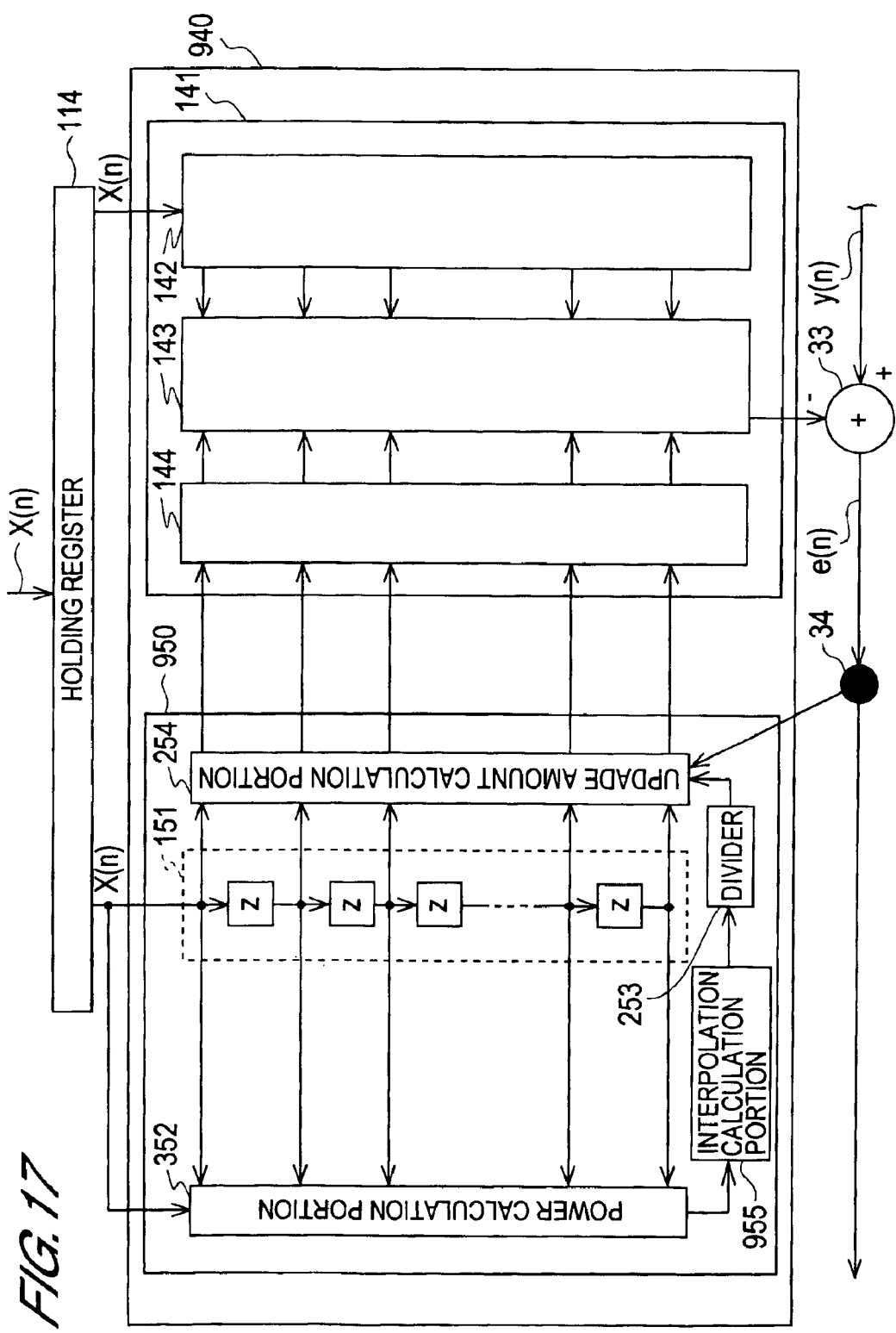

Except for replacing the smoother 355, between the above-described power calculation portion and the divider, with an interpolation calculation portion 955 which performs interpolation of delay sample signal trains within frames, this ninth embodiment is similar to the device of the third embodiment, and an example of its functions is shown in the block diagram of FIG. 17.

The interpolation calculation portion 955 calculates the above-described IAEP_BL_LPO(J) for the current frame, and also has a register in which the result can be stored.

(I-2) Operation of the Ninth Embodiment

In this ninth embodiment, the interpolation calculation portion 955 reads IAEP_BL_LPO(J−1) in the preceding neighboring frame from an internal register, and calculates the interpolating straight line with IAEP_BL_LPO(J) in the current frame using the following equation (23). Here X(J,k) represents the kth delay sample signal in the Jth frame.

$$IAEP\_LINE(J,K)=(IAEP\_BL\_LPO(J)-IAEP\_BL\_LPO(J-1)\times k/(L-1)+IAEP\_BL\_LPO(J-1) \quad (23)$$

That is, in the Jth frame, IAEP_LINE(J,k)=IAEP_BL_LPO(J−1) is obtained from the delay sample signal at the beginning (k=0). Also, IAEP_LINE(J,k)=IAEP_BL_LPO(J) is obtained from the 79th (k=79) delay sample signal at the end. Hence in the interval between them, IAEP LINE (J,k) changes linearly with the increase in the variable k of the delay sample signals.

In this case, the number of delay sample signals in each frame is fixed at 80, so that the calculation coefficient required in equation (23) is 1/(L−1)=0.012. If this is set initially in the interpolation calculation portion 955, equation (23) can be simplified to the following equation (24).

$$IAEP\_LINE(J,K)=0.012k\times(IAEP\_BL\_LPO(J)-IAEP\_BL\_LPO(J-1)+IAEP\_BL\_LPO(J-1) \quad (24)$$

This IAEP_LINE(J,k) is associated with the respective delay sample signals and input to the update amount calculation portion 254, update amounts are calculated for each delay sample signal using the following equation (25). and the tap coefficients Hk(n) of the FIR filter 141 are updated to the new tap coefficients Hk(n+1).

$$Hk(n+1)=Hk(n)+[IAEP\_LINE(j,K)] \times e(n-L) \times X(n-i-L) \quad (25)$$

(I-3) Advantageous Result of the Ninth Embodiment

By means of the ninth embodiment, interpolation within each frame is performed as if IAEP_BL_LPO changes minutely, and each tap coefficient is updated according to the power of delay sample signals.

Hence for a single frame, division is performed only once and the amount of calculation can be reduced, and in addition the tap coefficients can more closely follow changes in the power of audio signals for each delay sample signal, so that echo elimination with still higher accuracy can be achieved.

(J) Other Embodiments

In the above embodiments, examples were explained of application to an echo canceller connected to an exchange network in order to eliminate circuit echoes; however, these embodiments may also be applied to echo cancellers in systems in which background noise should be excluded, such as teleconferencing systems, automobile telephone systems and mobile communication systems, and in systems for communication over long distances such as ocean-floor cable communication systems and satellite communication systems. In order to eliminate acoustic echoes, a configuration may be used in which the above-described reception output terminal Rout 19 is replaced by a speaker, the transmission input terminal Sin 31 is replaced by a microphone, and the hybrid transformer 20 is replaced by an acoustic echo path.

As described above, in this invention an echo canceller which forms pseudo-echo signals from reception signals using an adaptive filter, and uses a subtractor to subtract the pseudo-echo signal from the transmission signal to eliminate the echo component in the transmission signal, has a holding portion which holds at least one communication frame length's worth of reception signals; a power calculation portion which calculates the power for each communication frame, based on the reception signals held in the holding portion; a divider which divides, by the power calculated for each communication frame, the echo elimination residue signal for each sample of a communication frame output from the above subtractor; and an update portion which updates the tap coefficients of the above adaptive filter according to output signals from the divider. Hence when calculating pseudo-echo signals while updating the tap coefficients of the adaptive algorithm, division by the power signal is performed only once for one communication frame, and the amount of calculation can be reduced.

What is claimed is:

1. An echo canceller which forms pseudo-echo signals from reception signals using an adaptive filter, and which subtracts pseudo-echo signals from transmission signals using a subtractor to eliminate the echo component in the transmission signals, and comprising:

a holding portion which holds at least one communication frame length's worth of reception signals;

a power calculation portion which calculates a power once only for each communication frame, based on the reception signals held in the holding portion;

a divider which divides, by the power calculated once only for each communication frame, an echo elimination residue signal for each sample of the communication frame output from said subtractor; and an update portion which updates tap coefficients of said adaptive filter according to output signals from the divider, wherein said power calculation portion calculates, for each communication frame, the reception signal power for the communication frame from samples of reception signals of the communication frame, wherein under prescribed conditions, said power calculation portion uses, in addition to the reception signals of the communication frame for power calculation, the reception signals of the communication frame preceding and/or following the communication frame for power calculation, to calculate the power, and wherein said power calculation portion calculates the power, either from the reception signals of the second half of the communication frame for power calculation and the reception signals of the first half of the communication frame following the communication frame for power calculation, totaling one communication frame length's worth of reception signals, or from the reception signals of the first half of the communication frame for power calculation and the reception signals of the second half of the communication frame preceding the communication frame for power calculation, totaling one communication frame length's worth of reception signals.

2. An echo canceller which forms pseudo-echo signals from reception signals using an adaptive filter, and which subtracts pseudo-echo signals from transmission signals using a subtractor to eliminate the echo component in the transmission signals, and comprising:

a holding portion which holds at least one communication frame length's worth of reception signals;

a power calculation portion which calculates a power once only for each communication frame, based on the reception signals held in the holding portion;

a divider which divides, by the power calculated once only for each communication frame, an echo elimination residue signal for each sample of the communication frame output from said subtracter; and an update portion which updates tap coefficients of said adaptive filter according to output signals from the divider, wherein said power calculation portion calculates, for each communication frame, the reception signal power for the communication frame from samples of reception signals of the communication frame, wherein under prescribed conditions, said power calculation portion uses, in addition to the reception signals of the communication frame for power calculation, the reception signals of the communication frame preceding and/or following the communication frame for power calculation, to calculate the power, and wherein said power calculation portion calculates the power after correcting into one communication frame length's worth of reception signals the reception signals of a total of two communication frames, in the communication frame for power calculation and in the communication frame either preceding or following the communication frame for power calculation.

3. An echo canceller which forms pseudo-echo signals from reception signals using an adaptive filter, and which subtracts pseudo-echo signals from transmission signals using a subtractor to eliminate the echo component in the transmission signals, and comprising:

a holding portion which holds at least one communication frame length's worth of reception signals;

a power calculation portion which calculates a power once only for each communication frame, based on the reception signals held in the holding portion;

a divider which divides, by the power calculated once only for each communication frame, an echo elimination residue signal for each sample of the communication frame output from said subtractor;

an update portion which updates tap coefficients of said adaptive filter according to output signals from the divider;

an interpolation calculation portion between said power calculation portion and said divider, wherein a power calculated for a preceding communication frame for division processing is set to be a power at the beginning of a following communication frame for division processing, and a power of said following communication frame for division processing is set to be a power at the end of said following communication frame for division processing; and wherein said interpolation calculation portion includes a circuit for getting an interpolation straight line for connecting reciprocal numbers of said powers at the beginning and end of the communication frame, said divider calculating a reciprocal number of a power on said interpolation straight line, obtained at each sample signal in the communication frame.

* * * * *